United States Patent
Yoon

(10) Patent No.: US 8,869,779 B2
(45) Date of Patent: Oct. 28, 2014

(54) CONTROLLING METHOD OF INTERCOOLER AND COOLING SYSTEM OF VEHICLE

(75) Inventor: Sungil Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 271 days.

(21) Appl. No.: 13/188,972

(22) Filed: Jul. 22, 2011

(65) Prior Publication Data

US 2012/0138025 A1 Jun. 7, 2012

(30) Foreign Application Priority Data

Dec. 7, 2010 (KR) .................... 10-2010-0124151

(51) Int. Cl.
| | |
|---|---|
| F02B 33/00 | (2006.01) |
| F28D 1/04 | (2006.01) |
| F02B 29/04 | (2006.01) |
| F28D 1/053 | (2006.01) |
| F28D 21/00 | (2006.01) |

(52) U.S. Cl.
CPC .......... *F02B 29/0456* (2013.01); *F28D 1/0435* (2013.01); *F02B 29/0493* (2013.01); *F28D 1/05375* (2013.01); *F02B 29/0475* (2013.01); *F28D 2021/0082* (2013.01); *F28D 2021/0094* (2013.01); *F28F 2250/06* (2013.01); *F02B 29/0418* (2013.01); *Y02T 10/146* (2013.01)
USPC ........................................ 123/563; 123/41.33

(58) Field of Classification Search
CPC .............. F01P 5/00; F01P 11/00; F02B 33/00

USPC ............................................... 123/563, 41.33
See application file for complete search history.

(56) References Cited

U.S. PATENT DOCUMENTS

| | | | | |
|---|---|---|---|---|
| 4,062,188 | A | * | 12/1977 | Cutler et al. ..................... 60/599 |
| 5,072,698 | A | * | 12/1991 | Fujihira et al. ................. 123/563 |
| 5,172,753 | A | * | 12/1992 | Kadle et al. ...................... 165/42 |
| 5,353,757 | A | * | 10/1994 | Susa et al. .................. 123/41.29 |
| 5,547,019 | A | * | 8/1996 | Iacullo ............................. 165/51 |
| 5,632,256 | A | * | 5/1997 | Eibl ............................... 123/563 |
| 6,367,256 | B1 | * | 4/2002 | McKee ........................ 60/605.2 |

(Continued)

FOREIGN PATENT DOCUMENTS

| | | |
|---|---|---|
| JP | 59145325 A | 8/1984 |
| KR | 1998-035974 U | 9/1998 |

(Continued)

*Primary Examiner* — Thomas Denion
*Assistant Examiner* — Shafiq Mian
(74) *Attorney, Agent, or Firm* — Morgan, Lewis & Bockius LLP

(57) ABSTRACT

A method controls an intercooler of a vehicle including a bypass valve that is disposed between an inlet and an outlet connected to the ends of a U-shaped cooling part and is opened/closed such that compressed air is directly bypassed from the inlet to the outlet, without passing through the cooling part. The method includes determining whether to bypass compressed air injected in the intercooler by measuring one or more of engine load, vehicle speed, engine revolution speed, and gear stage, closing the bypass valve to block the flow between the inlet and the outlet when the compressed air needs to be bypassed, and opening the bypass valve such that the compressed air directly flows between the inlet and the outlet when it is smaller than the cooling reference value, when the compressed air does not need to be bypassed.

4 Claims, 7 Drawing Sheets

(56) References Cited

U.S. PATENT DOCUMENTS

| | | | |
|---|---|---|---|
| 6,799,631 B2 * | 10/2004 | Acre | 165/297 |
| 7,814,966 B2 * | 10/2010 | Prior | 165/86 |
| 8,042,635 B2 * | 10/2011 | Kang | 180/68.4 |
| 2004/0108097 A1 * | 6/2004 | Ueda | 165/42 |
| 2010/0139584 A1 * | 6/2010 | Yoon et al. | 123/41.33 |

FOREIGN PATENT DOCUMENTS

| | | |
|---|---|---|
| KR | 1999-019686 A | 3/1999 |
| KR | 10-1999-0053384 A | 7/1999 |
| KR | 100267331 B1 | 7/2000 |
| KR | 10-2010-0041102 A | 4/2010 |
| KR | 10-2010-0064977 A | 6/2010 |

* cited by examiner

WIND

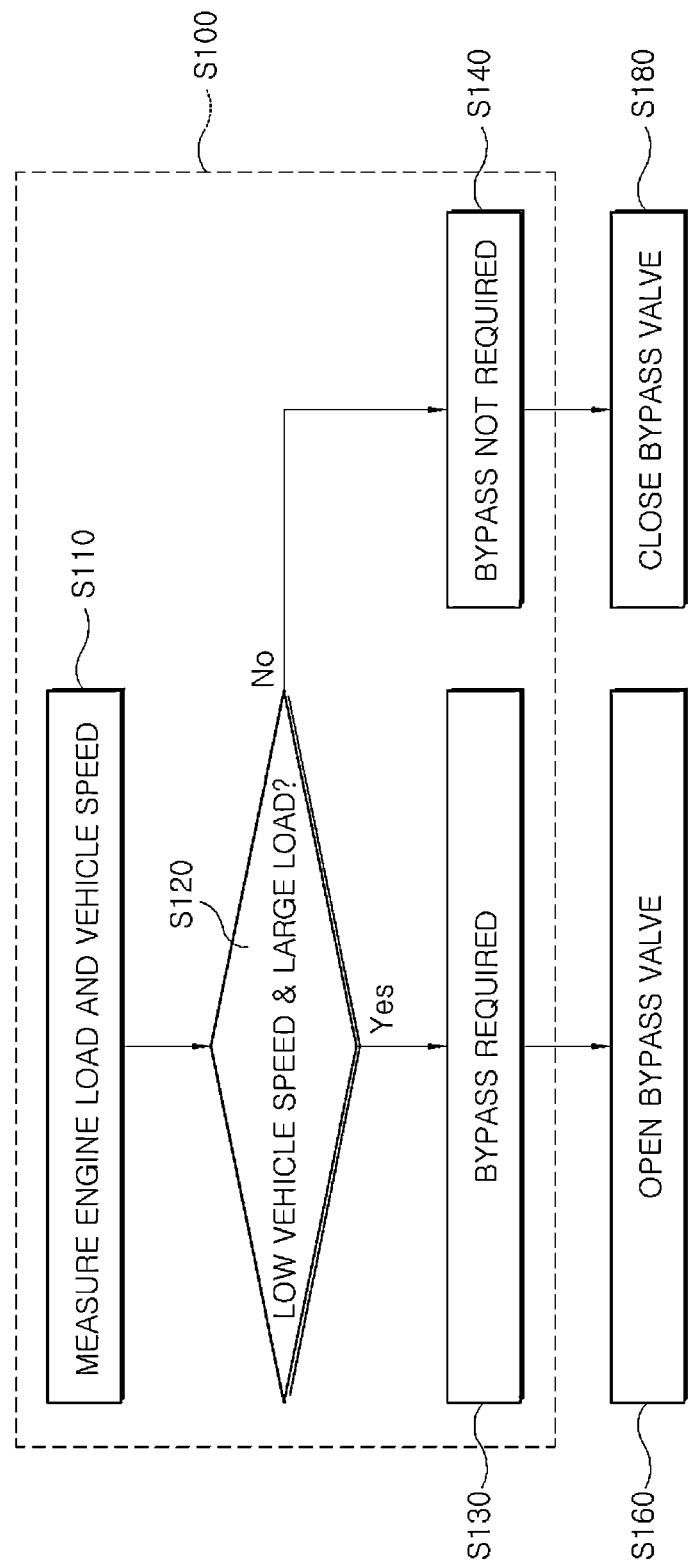

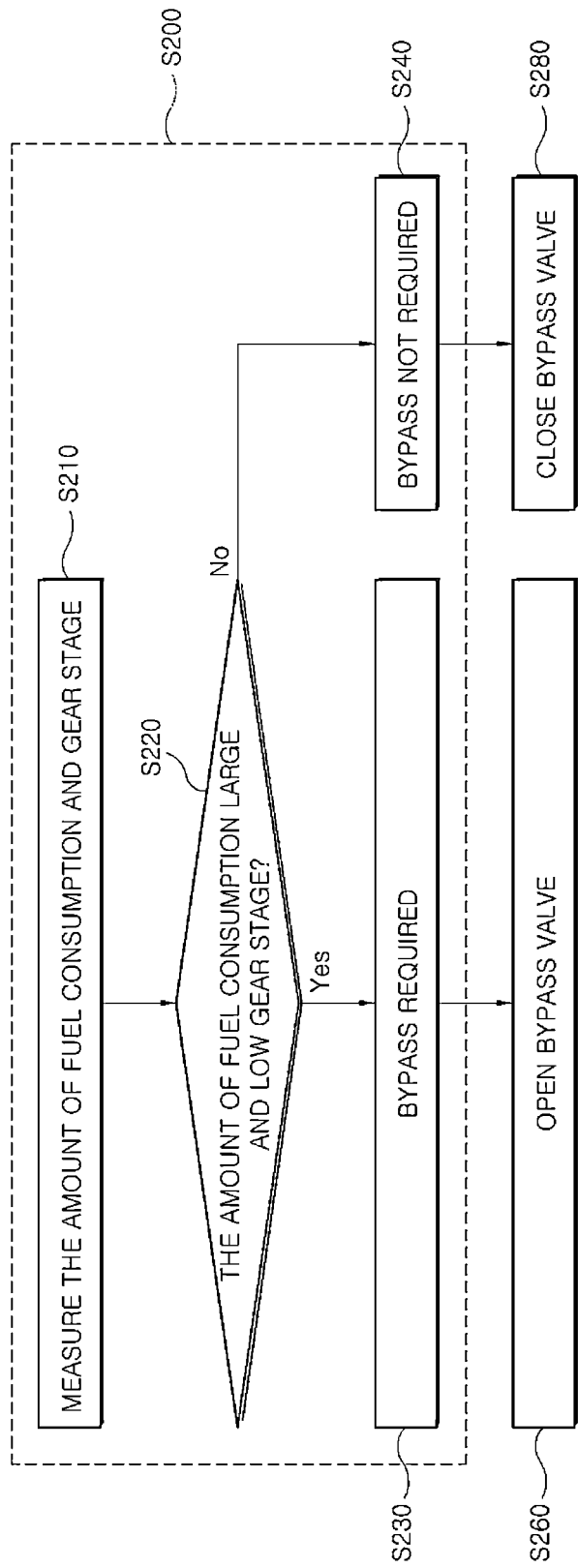

CONTROLLING METHOD OF INTERCOOLER AND COOLING SYSTEM OF VEHICLE

CROSS-REFERENCE TO RELATED APPLICATIONS

The present application claims priority to Korean Patent Application Number 10-2010-0124151 filed Dec. 7, 2010, the entire contents of which application is incorporated herein for all purposes by this reference.

BACKGROUND OF INVENTION

1. Field of Invention

The present invention relates to a method of controlling an intercooler of a vehicle, and more particularly, to a method of controlling an intercooler of a vehicle and a cooling system of a vehicle, which can improve cooling efficiency in connection with a radiator, by controlling the flow of pressurized air of a turbocharger which is injected into the intercooler.

2. Description of Related Art

In general, an intercooler is used for a vehicle equipped with a turbocharger to cool air compressed by a turbocharger.

The turbocharger compresses intake air (external air) by using the pressure of exhaust gas discharged through the exhaust manifold of an engine and supplies the compressed air to an intercooler and the intercooler supplies the intake air with temperature increased when the external air is compressed by the turbocharger to the intake manifold of the engine while effectively cooling the intake air with the wind, such that the output and fuel efficiency of the engine are improved and the exhaust gas and the engine noise are reduced.

Further, the radiator is a device that cools the cooling water heated through the engine and generally composed of an upper tank, a lower tank, and a radiator core. The radiator cools the external air flowing inside by the operation of a cooling fan or by using the wind flowing inside by traveling of the vehicle, when the cooling water with the temperature increased passes through the radiator core.

That is, the radiator and the intercooler are both modules that cool the vehicle, using the wind, and the intercooler is generally disposed at the front portion of the hood while the radiator and the cooling fan are disposed at the rear portion.

FIG. 1 is a schematic view showing an intercooler 3 and a radiator 4 and FIG. 2 is a view showing the inside of intercooler 3 shown in FIG. 1.

In general, air pressurized by a turbocharger flows into intercooler 3 through intake hose 1 and the air is cooled through intercooler 3 and then flows again into the engine through an exhaust hose 2.

As shown in FIG. 2, a bypass route 7 is formed at the lower portion of a cooling pipe of existing intercooler 3 and the flow of air is controlled to selectively flow to intercooler cooling pipe 6 or bypass route 7 through a bypass valve 5.

However, intercooler 3 of the related art shown in FIG. 2, the path along which the air flows when the air is cooled and the path along which the air flows when the air is not cooled should be formed in separate spaces in the structure. Since always only one of the two paths is used, efficiency reduces and the manufacturing cost and weight increase.

Further, since the wind is supplied to radiator 4 through intercooler 3, when the wind absorbs heat a lot from intercooler 3, the cooling efficiency of radiator 4 reduces, but it cannot be efficiently controlled.

The size of intercooler 3 and radiator 4 is increase such that the wind exchanges heat in contact with many areas, in order to remove the problem, which reduces the efficiency and increases the manufacturing cost and weight.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method of controlling an intercooler of a vehicle which can increase cooling efficiency in connection with a radiator, by controlling the flow of pressurized air of a turbocharger which is injected into the intercooler.

Various aspects of the present invention provide for method of controlling an intercooler of a vehicle including a bypass valve that is disposed between an inlet and an outlet connected to the ends of a U-shaped cooling part and is opened/closed such that compressed air is directly bypassed from the inlet to the outlet, without passing through the cooling part, the method including determining whether to bypass compressed air injected in the intercooler by measuring one or more of engine load, vehicle speed, engine revolution speed, and gear stage, closing the bypass valve to block the flow between the inlet and the outlet when the compressed air needs to be bypassed, and opening the bypass valve such that the compressed air directly flows between the inlet and the outlet when it is smaller than the cooling reference value, when the compressed air does not need to be bypassed.

In the opening of the bypass valve, some of the compressed air injected in the inlet passes through the cooling part, and the compressed air cooled through the cooling part and the compressed air at high temperature flowing in the inlet are mixed and flows out to the outlet.

The determining whether to bypass further includes measuring the temperature of external air outside the vehicle, and determines that bypass is required when the temperature of the external air is low.

Various aspects of the present invention provide for a cooling system of a vehicle that is disposed at the front portion of the vehicle and prevents overheat of an engine by using the wind, the system including an intercooler including a bypass valve that is disposed between an inlet and an outlet connected to the ends of a U-shaped cooling part and is opened/closed such that compressed air is directly bypassed from the inlet to the outlet, without passing through the cooling part, a radiator disposed behind the intercooler in the vehicle and cools cooling water, and a control unit receives one or more of information on engine load, vehicle speed, engine revolution speed, and gear stage, determines whether to bypass the intercooler on the basis of the information, and controls the bypass valve to be opened/closed in accordance with the determined result.

According to the various aspects of the present invention, it can increase cooling efficiency of the entire vehicle by intensively cooling a part that need to be cooled in connection with the radiator, by controlling the flow of the compressed air of the turbocharger which is injected into the intercooler.

Further, according to various aspects of the present invention, since it is possible to implement bypass function from the intercooler itself, a specific high-pressure ERG (Exhaust Gas Recirculation) cooler bypass valve can be removed, such that it is possible to reduce the weight by simplifying the system, and the parts is reduced, such that the manufacturing cost is reduced.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a diagram illustrating an exemplary method of controlling an intercooler of a vehicle according to the present invention.

FIG. 7 is a diagram illustrating another exemplary method of controlling an intercooler of a vehicle according to the present invention.

Figure 1:
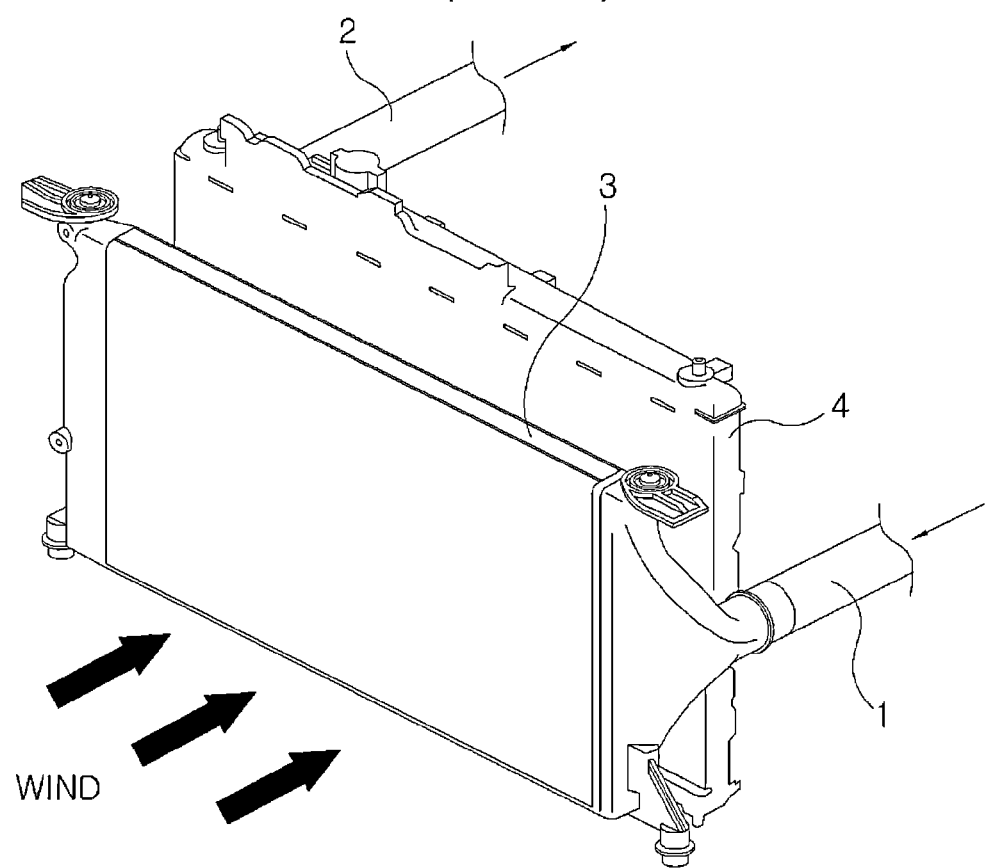
FIG. 1 is a schematic view showing an intercooler and a radiator according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

When it is determined that detailed descriptions for well-known technologies may unnecessarily make the point of the present invention unclear, the detailed descriptions are not provided, in explaining the present invention. Terms described in the specification is used to discriminate one component from other components.

Figure 3:
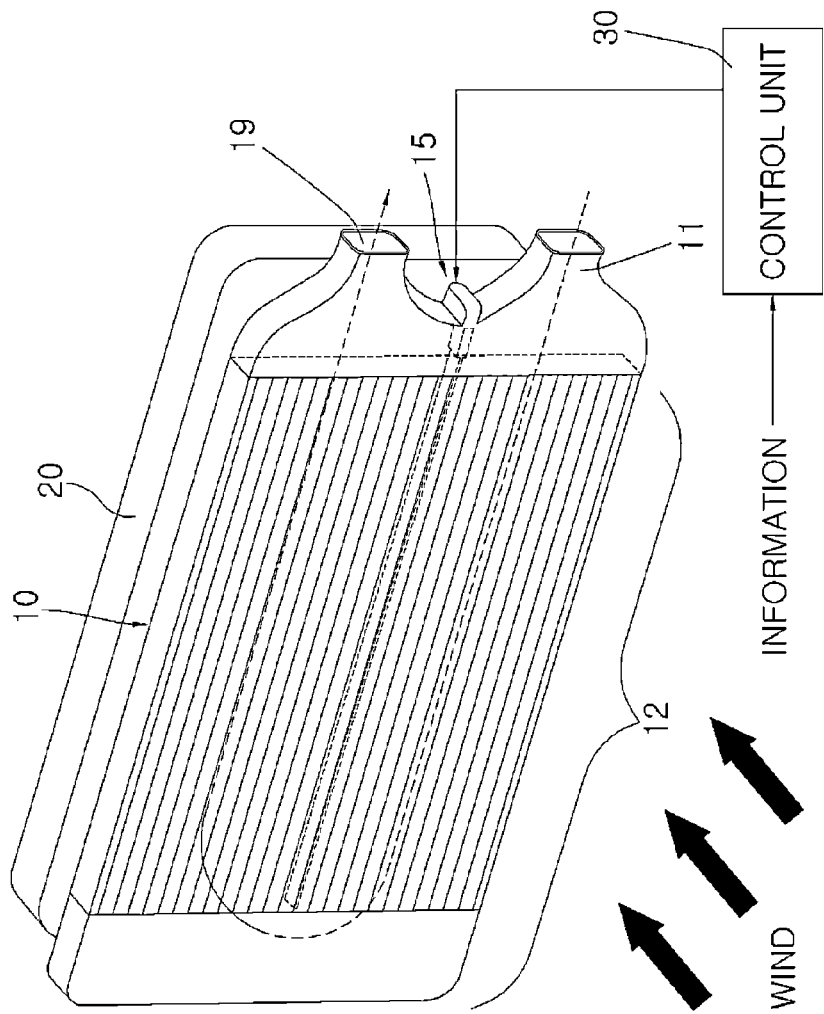
FIG. 3 is a schematic view showing an exemplary cooling system of a vehicle according to the present invention.

Referring to FIG. 3 showing a radiator 20 and an intercooler 10, a cooling system of a vehicle of the present invention is largely composed of intercooler 10, which is composed of a U-shape cooling part 12 and a bypass valve 15 disposed between an inlet 11 and an outlet 19, a radiator 20, and a control unit 30 that controls bypass valve 15 of the intercooler by using the status information of the vehicle.

Radiator 20 is a device that cools the cooling water heated through the engine and generally composed of an upper tank, a lower tank, and a radiator core. Radiator 20 cools the external air flowing inside by the operation of a cooling fan or by using the wind flowing inside by traveling of the vehicle, when the cooling water with the temperature increased passes through the radiator core.

Compared with intercooler 10, the radiator is disposed behind intercooler 10 in the vehicle, such that cooling efficiency of radiator 20 depends on how much heat is absorbed by the wind through intercooler 10.

Intercooler 10 is composed of inlet 11, cooling part 12, outlet 19, and bypass valve 15.

Inlet 11 is connected with a turbocharger that compresses exhaust gas discharged from the exhaust manifold of the engine and compressed air is injected into intercooler 10 through inlet 11 from the turbocharger. The compressed air exchanges heat with the wind while flowing along a path in cooling part 12. The compressed air with the temperature decreased through cooling part 12 is discharged again to the engine through outlet 19.

Figure 2:
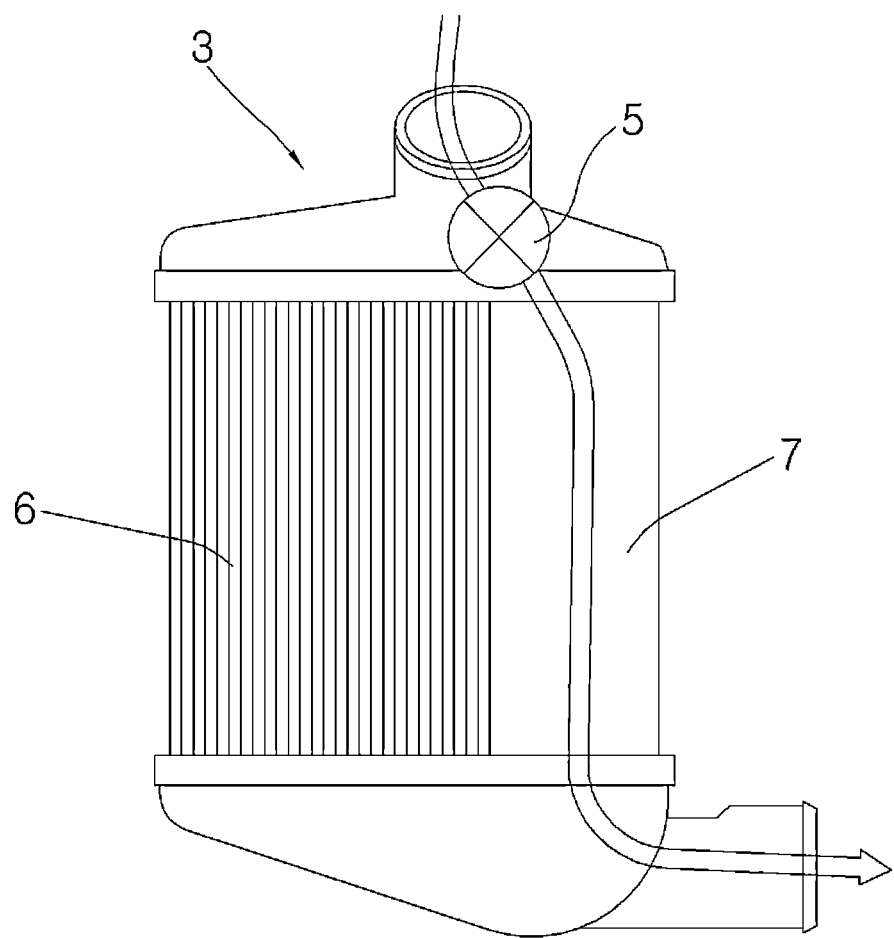
FIG. 2 is a view showing the inside of the intercooler shown in FIG. 1.

As shown in FIG. 3, cooling part 12 has a U-shape channel. Since the compressed air flows through the U-shaped channel, the cooling path becomes two times that of intercooler 3 of the related art shown in FIG. 2, such that the cooling efficiency increases. Inlet 11 and outlet 19 are arranged in parallel at a side of cooling part 12 and connected to the ends of the U-shape of cooling part 12.

Figure 4:
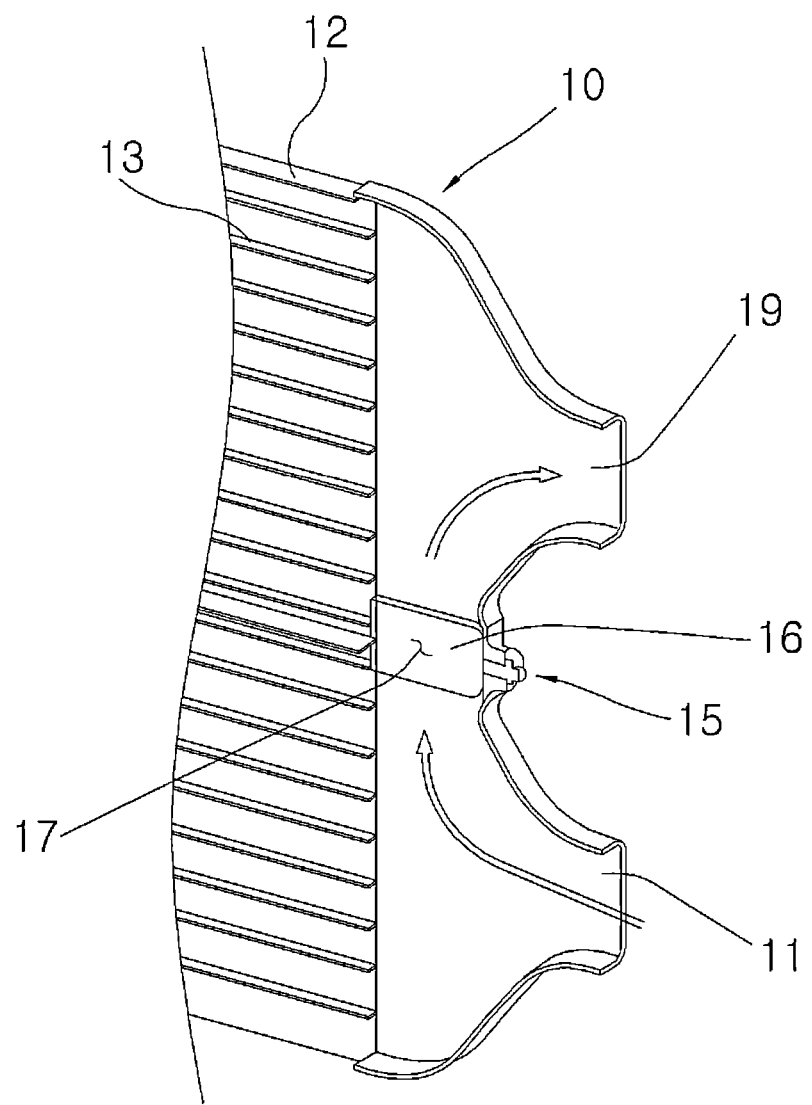
FIG. 4 is a view showing the flow of compressed air, with a bypass valve open, according to an exemplary method of controlling an intercooler of a vehicle according to the present invention.
Figure 5:
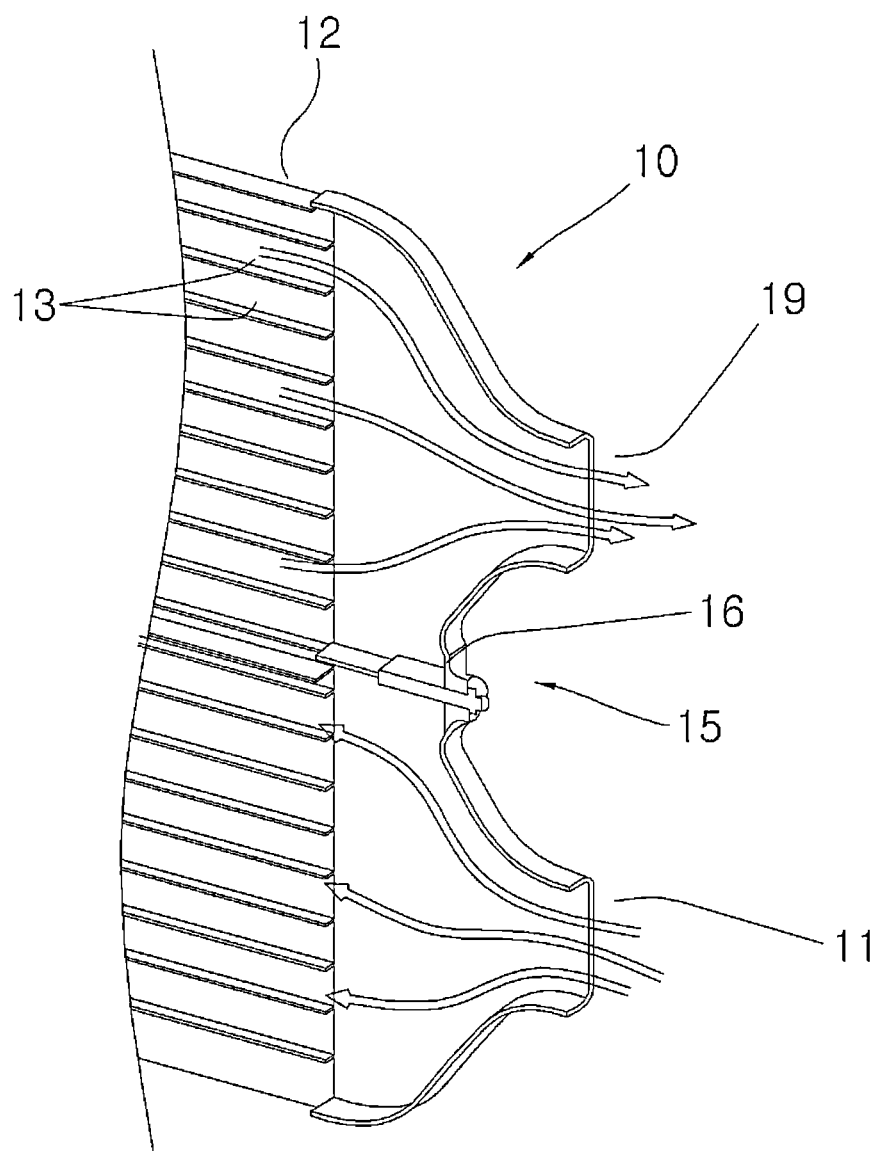
FIG. 5 is a view showing the flow of compressed air, with the bypass valve closed, according to an exemplary method of controlling an intercooler of a vehicle according to the present invention.

FIGS. 4 and 5 are cross-sectional views showing the inside of the part with inlet 11 and outlet 19 of intercooler 10, in which cooling fins 13 of cooling part 12 and bypass valve 15 disposed between inlet 11 and outlet 19 are shown.

Cooing fins 13 not only guides the flow of the compressed air passing through cooling part 12, but increases the contact area with intercooler 10.

Bypass valve 15 is positioned between inlet 11 and outlet 19 arranged in parallel at a side. In various embodiments, a rotary bypass valve plate 16 is included, such that bypass valve 15 operates such that rotary bypass valve plate 16 closes or opens the passage between inlet 11 and outlet 19 while rotating.

FIG. 4 is a view showing when bypass valve 15 is open (rotary bypass valve plate 16 does not close the passage between inlet 11 and outlet 19) and FIG. 5 a view showing when bypass valve 15 is closed (rotary bypass valve plate 16 closes the passage between inlet 11 and outlet 19).

As shown in FIG. 4, as bypass valve 15 is opened, the compressed air is directly bypassed from inlet 11 to outlet 19, even not through cooling part 12.

On the contrary, as shown in FIG. 5, as bypass valve 15 is closed, the air current connection between inlet 11 and outlet 19 can be implemented only through cooling part 12, such that the compressed air passes through cooling part 12.

Control unit 30 receives one or more of information on engine load, vehicle speed, engine revolution speed, and gear stage and determines whether to bypass the intercooler on the basis of the information and controls the bypass valve to be opened/closed in accordance with the determined result.

That is, the operation of bypass valve 15 is controlled on the basis of one or more information on engine load, vehicle speed, engine revolution speed, and gear stage, which are inputted from control unit 30.

Hereinafter, a method of controlling intercooler 10 that cools a vehicle by using the cooling system of a vehicle shown in FIGS. 3 to 5 is described in detail with reference to FIGS. 6 and 7.

FIG. 6 is a flowchart showing a control method of cooling a vehicle by controlling intercooler 10 shown in FIGS. 3 to 5.

First, whether to bypass the compressed air injected in intercooler 10 is determined (S100). In order to determine whether to bypass, it is determined that which one of intercooler 10 and radiator 20 more requires cooling by measuring the engine load and vehicle speed (S110).

Because the vehicle travels at a low speed of about 30 km in a towing mode for pulling a heave load, availability of the turbocharger become low, but the load exerted in the engine is high, such that it is more important to cool radiator 20 than intercooler 10. In this case, it is required to bypass the compressed air passing through intercooler 10 such that the wind fails to absorb heat a lot from intercooler 10 in order to cool radiator 20.

That is, it is determined that the status is under low vehicle speed and high load (S120), and it is determined that bypass is required when the status is under low vehicle speed and high load (S130), or it is determined that bypass is not required (S140).

Next, whether to open/close bypass valve 15 is determined (S160 and S180) in accordance with the result of determining whether bypass is required.

In this state, as shown in FIG. 4, bypass valve 15 is opened such that the compressed air directly flows between inlet 11 and outlet 19 (S160). As a result, the wind passing through intercooler 10 does not need to absorb heat a lot from inter cooler 10, such that it reaches, at low temperature, radiator 20, and absorbs the heat of the cooling water in radiator 20.

Although it is possible to completely block the flow of the compressed air to cooling part 12 when opening bypass valve 15, when the flow of the compressed air to cooling part 12 is not blocked, some of the compressed air injected into inlet 11 passes through cooling water 12, and the compressed air with the temperature decreased through cooling part 12 and the compressed air with high temperature flowing in inlet 11 are mixed and discharged through outlet 11.

That is, in this case, unlike when the flow of the compressed air to cooling part 12 is completely blocked, it is possible to partially cooling the compressed air in intercooler 10. However, most compressed air flows to the outside not through cooling part 12 with a relatively narrow channel, but directly through outlet 11, by opening bypass valve 15.

On the contrary, in an intercooler 10-important cooling mode in which it is important to cool the compressed air flowing in intercooler 10, as in the high vehicle speed/high load state, it is determined that bypass is not required (S140). As shown in FIG. 5, bypass valve 15 is closed to block the compressed air directly flowing to outlet 19 through inlet 11 (S180).

The compressed air flowing in inlet 11 flows to outlet 19 through cooling part 12 and the wind absorbs heat a lot from the compressed air passing through intercooler 10. In this state, since the speed of the vehicle is high, the amount of wind is relatively large, such that the wind can cool radiator 20 even if absorbing heat from intercooler 10.

FIG. 7 is a flowchart illustrating various embodiments of the present invention, in which intercooler 10 shown in FIGS. 3 to 5 are used too. However, in this case, the reference determining whether bypass is required, as in various embodiments described above, is the reference of the amount of fuel consumed by the engine and the level of gear stage.

In order to determine whether to bypass the compressed air injected in intercooler 10 (S200), it is determined that it is an intercooler 10-important cooling mode in which intercooler 10 is required to be more cooled or a radiator 20-important cooling mode in which radiator 20 is required to be more cooled, by measuring the amount of fuel consumed by the engine and the gear stage (S210).

In the towing mode for pulling a heavy load, heave weight is moved by operating at a lower gear (first stage/second stage). In this state, the engine consumes more fuel by the vehicle speed is low, and the amount of fuel consumption is large, such that it is important to cooling radiator 20. Therefore, it is required to bypass the compressed air passing through intercooler 10 such that the wind cannot absorb heat a lot from intercooler 10.

That is, by determining whether the amount of fuel consumption is large and the gear stage is low (S220), it is determined that bypass is required when the amount of fuel consumption is large and the gear stage is low (S230), or it is determined that bypass is not required (S240).

Opening bypass valve (S260) and closing bypass valve (S280) after determining whether bypass is required are similar to that described above, such that it is not described.

As described above, the method of controlling an intercooler of a vehicle of the present invention can increase cooling efficiency of the entire vehicle by intensively cooling a part that need to be cooled in connection with the radiator, by controlling the flow of the compressed air of the turbocharger which is injected into the intercooler.

Further, since it is possible to implement bypass function from the intercooler itself, a specific high-pressure ERG cooler bypass valve can be removed, such that it is possible to reduce the weight by simplifying the system, and decrease the manufacturing cost.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an intercooler of a vehicle, wherein the intercooler is disposed in front of a radiator, the method comprising:
   providing a bypass valve disposed between an inlet and an outlet connected to opposing ends of a U-shaped cooling part of the intercooler, wherein the cooling part includes a U-shaped channel through which a compressed air flows to be cooled by exchanging heat with wind when the bypass valve is closed or partially opened and the compressed air is directly bypassed from the inlet to the outlet, without passing through the cooling part when the bypass valve is fully opened;

determining whether the intercooler or the radiator requires more cooling by measuring one or more of engine load, vehicle speed and gear stage;

closing the bypass valve when the intercooler requires more cooling than the radiator; and opening the bypass valve when the radiator requires more cooling than the intercooler;

when the intercooler requires more cooling than the radiator, the engine is under a first predetermined vehicle speed and under a first predetermined load, and when the radiator requires more cooling than the intercooler the engine is under a second predetermined vehicle speed and a second predetermined load;

wherein the first predetermined vehicle speed is higher than the second predetermined vehicle speed; and wherein the first predetermined vehicle load is lower than the second predetermined vehicle load.

2. The method as defined in claim 1, wherein the determining of whether the bypass is required determines that the bypass is required when high load is applied to an engine at a low vehicle speed.

3. The method as defined in claim 1, wherein the determining of whether to bypass determines that the bypass is required when the amount of fuel consumption is large and the vehicle travels at a low gear stage.

4. The method as defined in claim 1, wherein when the bypass valve is open, a portion of the compressed air is injected in the inlet passes through the cooling part, wherein the compressed air cooled through the cooling part and the compressed air flowing at high temperature in the inlet are mixed and flows out from the outlet.

* * * * *